(12) United States Patent
Wendling

(10) Patent No.: US 9,060,097 B2
(45) Date of Patent: Jun. 16, 2015

(54) METHOD TO MANAGE THE POWER SETTING OF A RECEIVER/DECODER FOR PAY-TV USING MANAGEMENT MESSAGES CONTAINING A FIRST PERIOD DEFINING A WAITING PERIOD FOR SUBSEQUENT MANAGEMENT MESSAGES

(75) Inventor: Bertrand Wendling, Rolle (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 745 days.

(21) Appl. No.: 13/155,849

(22) Filed: Jun. 8, 2011

(65) Prior Publication Data

US 2011/0307725 A1    Dec. 15, 2011

(30) Foreign Application Priority Data

Jun. 11, 2010  (EP) .................................. 10165611

(51) Int. Cl.
| | | |
|---|---|---|
| G06F 1/00 | (2006.01) | |
| H04N 7/167 | (2011.01) | |
| G06F 21/10 | (2013.01) | |
| H04N 5/63 | (2006.01) | |
| H04N 21/266 | (2011.01) | |
| H04N 21/433 | (2011.01) | |
| H04N 21/4405 | (2011.01) | |
| H04N 21/4623 | (2011.01) | |
| H04N 21/6543 | (2011.01) | |
| H04W 52/02 | (2009.01) | |

(52) U.S. Cl.
CPC .............. *H04N 7/1675* (2013.01); *G06F 21/10* (2013.01); *H04N 5/63* (2013.01); *H04N 21/26606* (2013.01); *H04N 21/4333* (2013.01); *H04N 21/4405* (2013.01); *H04N 21/4623* (2013.01); *H04N 21/6543* (2013.01); *H04W 52/0229* (2013.01); *H04W 52/0235* (2013.01); *Y02B 60/50* (2013.01)

(58) Field of Classification Search
CPC .............................. G06F 1/3218; G06F 1/3265
USPC .......................................................... 713/300
See application file for complete search history.

(56) References Cited

U.S. PATENT DOCUMENTS

| 5,440,632 A | 8/1995 | Bacon |
|---|---|---|
| 5,666,293 A | 9/1997 | Metz et al. |

(Continued)

FOREIGN PATENT DOCUMENTS

| EP | 0 895 415 | 2/1999 |
|---|---|---|
| EP | 1 876 527 | 1/2008 |

(Continued)

OTHER PUBLICATIONS

European Search Report issued in EP 10 16 5611, dated Nov. 16, 2010.

(Continued)

*Primary Examiner* — Mohammed Rehman
(74) *Attorney, Agent, or Firm* — DLA Piper LLP US

(57) ABSTRACT

A method to manage the power setting of a receiver/decoder for pay-TV comprising a timer and means to receive management messages, the power setting comprising at least three states, the active state during which the reception and the decoder is active, the active/standby state during which the receiver is active for the reception of management messages and the standby state during which the receiver/decoder is in idle mode.

7 Claims, 2 Drawing Sheets

(56) References Cited

U.S. PATENT DOCUMENTS

| | | | |
|---|---|---|---|
| 5,794,117 | A | 8/1998 | Benard |
| 5,835,911 | A | 11/1998 | Nakagawa et al. |
| 6,373,904 | B1 | 4/2002 | Sakamoto et al. |
| 6,584,199 | B1 | 6/2003 | Kim et al. |
| 6,964,060 | B2 * | 11/2005 | Kamperman et al. ........... 725/31 |
| 7,778,230 | B2 * | 8/2010 | Fulknier et al. ............... 370/338 |
| 7,913,272 | B2 | 3/2011 | Sasselli et al. |
| 8,185,756 | B2 * | 5/2012 | Okamoto et al. ............... 713/300 |
| 8,347,128 | B2 * | 1/2013 | Suzuki et al. .................. 713/310 |
| 8,484,673 | B2 * | 7/2013 | Moreillon ........................ 725/31 |
| 2003/0147531 | A1 | 8/2003 | Sasselli et al. |
| 2004/0068541 | A1 | 4/2004 | Bayassi et al. |
| 2006/0004661 | A1 | 1/2006 | Bacon |
| 2006/0072520 | A1 | 4/2006 | Chitrapu et al. |
| 2006/0117392 | A1 * | 6/2006 | Courtin et al. .................. 726/27 |
| 2006/0271492 | A1 | 11/2006 | Candelore et al. |
| 2007/0133797 | A1 * | 6/2007 | Schipper et al. .............. 380/231 |
| 2007/0233839 | A1 * | 10/2007 | Gaos ............................. 709/223 |
| 2007/0261076 | A1 | 11/2007 | Puputti |
| 2009/0045970 | A1 * | 2/2009 | Miyabayashi et al. ... 340/825.22 |
| 2009/0245748 | A1 * | 10/2009 | Miyazaki ........................ 386/46 |
| 2010/0115318 | A1 * | 5/2010 | Suzuki et al. ................. 713/323 |

FOREIGN PATENT DOCUMENTS

| | | |
|---|---|---|
| WO | WO 98/43426 | 10/1998 |
| WO | WO 01/97518 | 12/2001 |
| WO | WO 2005/091635 | 9/2005 |

OTHER PUBLICATIONS

"Functional Model of a Conditional Access System", EBU Review—Technical, No. 266, pp. 64-77, Winter 1995, XP000559450.

Abstract of D. Van Schooneveld, "Standardization of Conditional Access Systems for Digital Pay Television", Philips JOurnal of Research, vol. 50, Issues 1-2, pp. 217-225 (1996).

* cited by examiner

METHOD TO MANAGE THE POWER SETTING OF A RECEIVER/DECODER FOR PAY-TV USING MANAGEMENT MESSAGES CONTAINING A FIRST PERIOD DEFINING A WAITING PERIOD FOR SUBSEQUENT MANAGEMENT MESSAGES

INTRODUCTION

The present invention concerns the field of receiver/decoder such as set-top-box for Pay-TV receiver devices, in particular concerns the power consumption of such receiver/decoder.

BACKGROUND ART

A receiver/decoder or IRD (Integrated receiver/decoder) is in charge of receiving the broadcast signals, these signals being scrambled so that only the authorized IRD can have access to them. These signals form a plurality of services, each service representing a channel with audio, video and control data.

In order to descramble a service, the control data contain entitlement messages ECM in which the key (control word) to decrypt the audio and video data is transported as well as the access conditions. These ECM are also encrypted with a so-called "transport key". In the IRD, a security module is in charge of the security operations and in particular of the decryption of the ECM. The security module contains the transport key and decrypt the ECM. The access conditions are then compared with the access rights stored in the security module and if the access conditions are met, the control word is returned to the descrambler for descrambling the audio and video.

Security modules, as mentioned above, can be implemented in a variety of manners such as on a microprocessor card, on a smartcard or any electronic module in the form of a badge or key. These modules are generally portable and detachable from the receiver/decoder and are designed to be tamper-proof. The most commonly used form has electrical contacts but contactless versions of type ISO 14443 also exist. Another implementation of the security module exists where it is directly soldered inside the receiver/decoder, a variation of this being a circuit on a socket or connector such as a SIM module. Yet another implementation is to have the security module integrated on a chip which has another function e.g. on the de-scrambling module or on the microprocessor module of the receiver/decoder. The security module can also be implemented in software.

The transport key as well as the access rights are updated regularly by the management center by sending management messages EMM, these messages being encrypted by a key pertaining to the targeted security module.

The condition to receive without interruption the services is to receive the new keys (e.g. transport key) or new rights on time even if the IRD is not used by the user. This is why, the majority of IRD have in fact a false power down mode, the full functionalities staying on for receiving the messages sent by the management center. Only the user interaction in turn into idle, such as the screen. We will name this mode "active/standby state" for the rest of the description.

A first solution to avoid keeping the IRD in active/standby state is described in the document WO01/97518A1 in which the IRD pass from the active state to the active/standby state when the user activate the power down mode, this active/standby state allowing to receive the messages until the update of the IRD is done. At that time, the IRD pass to a complete standby state.

Another solution is described in the document US 2006/0004661 in which the receiver comprises a wake up logic to activate the receiver when the same is supposed to receive a message. After a pre-programmed time, the wake up logic send a signal to the receiver to go back into standby mode. This solution is based on a synchronization between the head-end and the receiver. The wake up time should be known by the head-end and the time window defined by the wake up logic should be used to send the messages to this receiver.

BRIEF DESCRIPTION OF THE INVENTION

The present invention aims at reducing the power consumption of a receiver/decoder connected to a broadcast channel.

It is proposed a method to manage the power setting of a receiver/decoder for pay-TV comprising a timer and means to receive management messages, the power setting comprising at least three states, the active state during which the reception and the decoder is active, the active/standby state during which the receiver is active for the reception of management messages and the standby state during which the receiver/decoder is in idle mode, said method comprising the steps of:
  receiving at least one management message EMM containing a first period, said period being loaded into a timer and defining a period during which no new management messages is awaited,
  receiving a request from a user to pass from the active state to the standby state,
  determining by the timer if the first period is terminated:
    in the positive event
      changing the power setting into active/standby state, waiting until the second management message is received, at reception of same, changing the power setting into standby state, and re-initializing the timer by the first period,
    in the negative event
      changing the power setting into standby state.

The user determines if the receiver/decoder is active or passive. In passive mode, the receiver/decoder can have two different states, namely the active/standby state and the standby state. The selection between these two states is determined according to the timer. We can divide the time scale into three phases, the update mode which is the phase starting with the reception of the first update message and finishes with the reception of the last update message, the sleeping phase during which the receiver/decoder has not the duty to wait for messages and the waiting phase during which the receiver/decoder is waiting the first message.

It is worth noting that the update mode can last only during the processing of one management message. The reception of the first management message triggers the beginning of the update mode, this message also containing the first period that is loaded once the processing of the management message is over. As a consequence, the first and second message is the same message.

BRIEF DESCRIPTION OF THE FIGURES

The present invention will be better understood thanks to the attached figures in which:
  the FIG. 1 illustrates the various phases of a receiver/decoder the FIG. 2 illustrates the receiver/decoder with the TV and the remote, the FIG. 3 illustrates the internal parts of the receiver/decoder, the FIG. 4 illustrates the three states of the receiver/decoder

DETAILED DESCRIPTION

Figure 1:
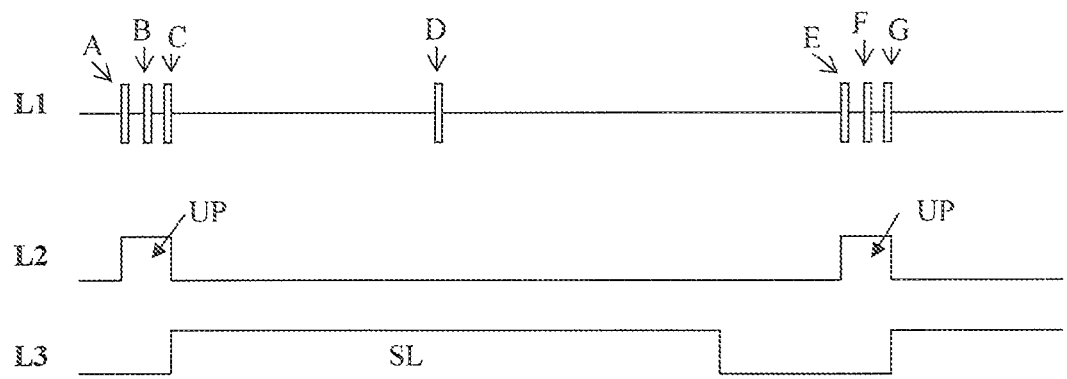

The FIG. 1 shows in a first time scale L1 the arrival of the management messages. These messages are included in the broadcast signal, this signal is processed in order to extract by the receiver the audio, video and data streams. One of the data stream contains the management messages i.e. the messages that are used by the conditional access system. We have two types of messages, the ECM related to a channel and containing the control word related to this channel and the EMM that contains keys or rights related to the management of the conditional access such has renewing the rights, renewing the access keys.

The non reception of the ECM has an immediate result of being unable to access the currently broadcasted event, when the non reception of the EMM can block completely the access to all channels by e.g. not renewing the transmission key that is used to decrypt the ECM.

It is therefore important that the receiver/decoder receives the EMM messages.

In the FIG. 1, line L1, we have illustrated the arrival of the EMM. We have a first series of three EMM (A, B, C). The first EMM contains renewal information and the reception of same start the updating process. This message (EMM A) thus places the receiver/decoder in updating mode (see line L2).

At the line L3, the timer is illustrated, with a high state when the timer has not run out the predefined time, and a low when the timer has finished the first period. In this state, when the user requests the power off of its receiver/decoder, the same switches to the mode active/standby state. The receiver/decoder is externally OFF although the receiver is still able to receive data, to filter the data stream and to pass it to the security module.

The arrival of the last EMM is this series (EMM C) close the update mode since all messages to renew the management data of the security module have been received. The last message EMM C contains a first period during which the receiver/decoder is not supposed to receive EMM. This first period is used to reload the timer and the status is therefore high. This is illustrated at the line L3. The first period SL is determined by the management center in charge of broadcasting the data. It could be a day or a month, depending of the security policy of this management center.

During that period, when the user requests a power down to its receiver/decoder, the same goes straight to standby state, thus deactivating the receiver. In case that the receiver/decoder is in standby state, the messages transmitted during this time (EMM D) are not received.

It is worth noting that in any state, the timer is still running to decrement the first period.

In case that the receiver/decoder is in standby state and the timer runs out of the first period, a signal is generated by the timer means to pass the receiver/decoder from standby state to active/standby state. This allows the receiver/decoder to be ready to receive EMM messages (EMM E, F, G). From that moment, the receiver/decoder will pass from active state to active/standby state according to the commands received by the user.

Figure 2:
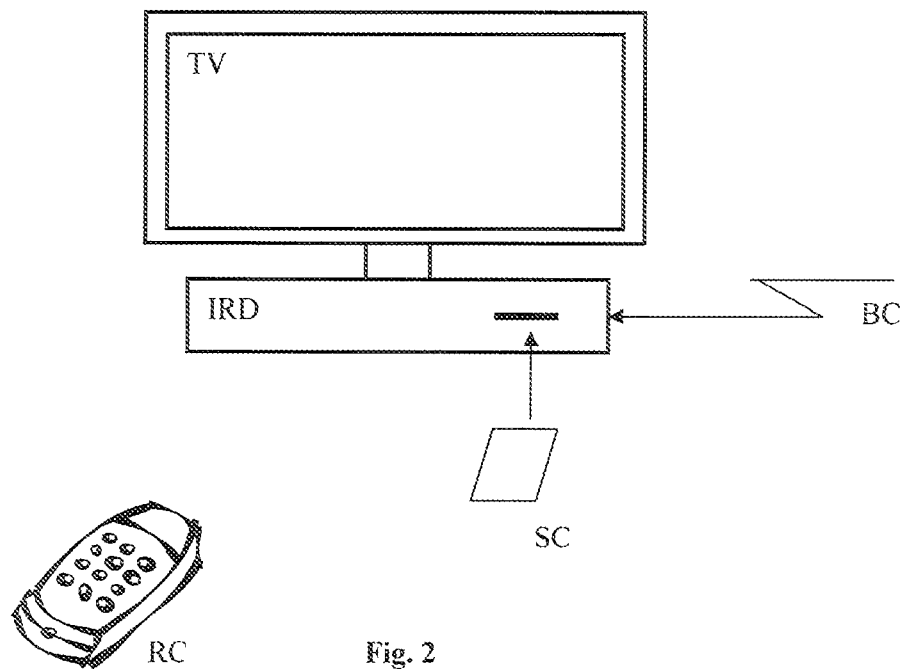

The FIG. 2 illustrates the various elements of the invention. The receiver/decoder IRD is connected to the signal source BC such as an antenna, a satellite receiver or an IP connection. The user can switch on or off the IRD with a remote control RC. The output of the IRD is connected with a screen TV which receives audio and video signals.

The IRD contains a security module and in one embodiment of said security module, a smartcard SC is inserted into a suitable slot into the IRD.

Figure 3:
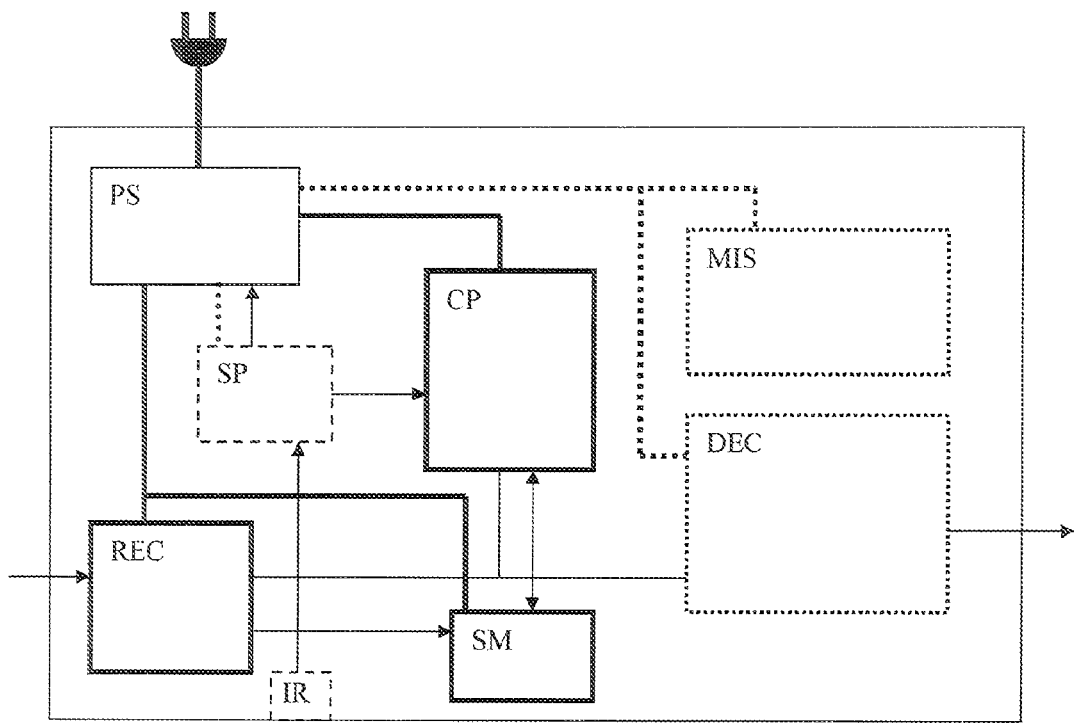

The FIG. 3 illustrates the internal elements of the receiver/decoder. In this example, the security module is a module SM directly embedded into the receiver/decoder.

The power supply bloc PS receives power from the main plug. It comprises at least three levels of activation which correspond with the three states of the receiver/decoder. In active state, all elements are powered.

In active/standby state, the elements that are not necessary to receive and process the messages are deactivated. This is the case for example for the audio/video decoder DEC as well as some other elements MIS which are in charge for example of the storage of the data, the USB connection, the display of messages.

The central processing unit CP is active to filter the various streams received from the receiver RFC. This central processing unit is in charge of feeding the security module SM with the messages pertaining to the conditional access system.

In standby state, the central processing unit can be deactivated and the power supply PS only keep active the elements able to pass from standby to active state. This is the case for the infra-red receiver IR, the secondary process unit SP in charge of recognizing the IR signal and interpreting the commands. The SP then transmits a command to the power supply PS to switch to active state.

According to one embodiment of the present invention, the secondary process unit SP contains the timer. This timer can then trigger the power supply to pass the receiver/decoder in active/standby state in case that the first period is over.

In the FIG. 3, the . . . illustrates the elements powered only in active state.

The _____ illustrates the elements powered in active/standby state.

The _ _ _ illustrates the elements powered only in standby state.

Figure 4:
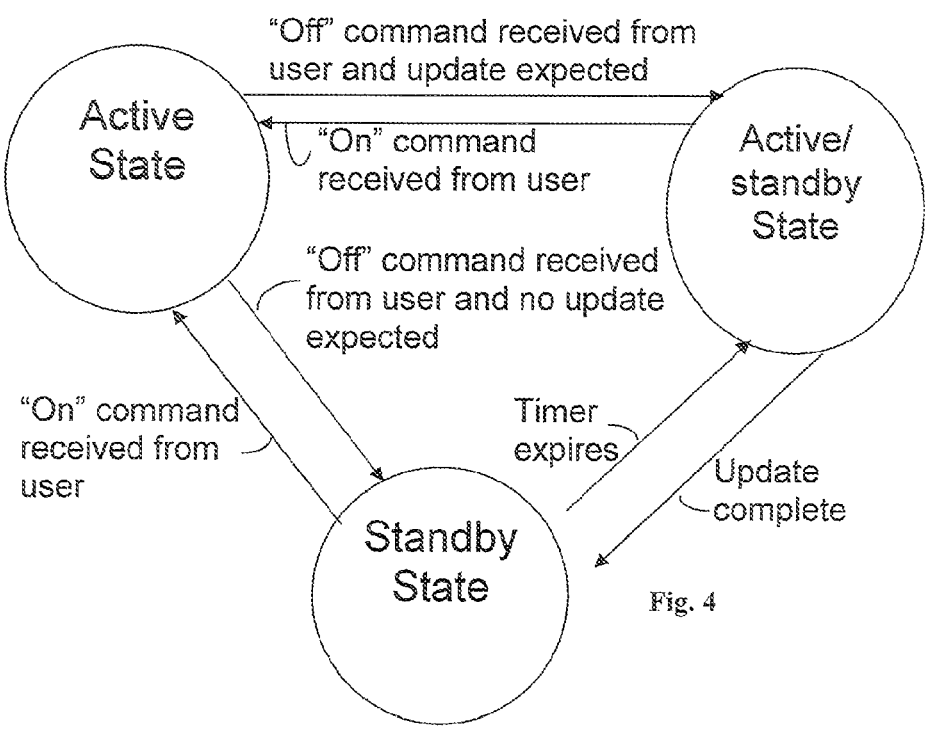

The FIG. 4 illustrates the various states of the receiver/decoder and the transitions between these states. In Active State, when an OFF command is received, the receiver determines if the first period SL is over and in the positive event, switches to the Active/Standby State so as to be able to receive EMM messages. In case that the first period SL is not terminated, the receiver switches to the Standby State. In these two states, the ON command of the user switches the receiver into Active State.

As already explained, the Active/standby State remains the state of the receiver until the updating process is terminated (Update completed). In Standby State, the timer is still running and the first period SL still checked. When the period is terminated, an automatic command is generated to pass the receiver into Active/Standby State.

The invention claimed is:

1. A method to manage a power setting of a receiver/decoder for pay-TV comprising a timer and means to receive management messages, the power setting comprising at least three states, an active state during which the reception and the decoder is active, an active/standby state during which the receiver is active for the reception of management messages, and a standby state during which the receiver/decoder is in idle mode, said method comprising the steps of:

receiving at least one management message containing a first period, said first period being loaded into a timer and defining a sleeping phase during which no new management messages are expected;
receiving a request from a user to pass from the active state to the standby state;
determining by the timer if the first period has expired and the sleeping phase has completed;
  if the first period has expired and the sleeping phase has completed;
    changing the power setting into the active/standby state to initiate a waiting phase; and
    during the waiting phase, waiting until a second management message, containing said first period, is received, and upon reception of the second management message, changing the power setting into the standby state, and re-initializing the timer by the first period;
  if the first period has not expired and the sleeping phase has not completed;
    changing the power setting into the standby state,
wherein the received management messages further comprise information for renewing rights related to conditional access to broadcast signals.

2. The method of claim 1, further comprising the steps of, in the case that the power setting is in the standby state:
determining by the timer that the first period has expired and the sleeping phase has completed; and
changing the power setting from the standby to the active/standby state.

3. The method of claim 1, wherein the receiver/decoder receives a plurality of management messages during an update, the last management message containing the first period and triggering the change into the standby state.

4. The method of claim 2, wherein the receiver/decoder receives a plurality of management messages during an update, the last management message containing the first period and triggering the change into the standby state.

5. The method of claim 1, wherein in case that the receiver/decoder is in the active state while the management messages are received, the reception of the last message does not change the state of the receiver/decoder.

6. The method of claim 2, wherein in case that the receiver/decoder is in the active state while the management messages are received, the reception of the last message does not change the state of the receiver/decoder.

7. A receiver/decoder for receiving and decoding Pay-TV video contents, said contents being secured by encryption keys, said keys being directly or indirectly loaded into the decoder by management messages, said decoder having at least three states, an active state during which the reception and the decoder is active, an active/standby state during which only the reception of management messages is active, and a standby state during which the decoder is in idle mode, said decoder comprising a timer and means to switch between the three states, said decoder having means to extract a timer value from the management message and to load it into the timer, said decoder having means to receive a command to pass from the active state to the standby state, the receiver/decoder comprising means for:
receiving at least one management message containing a first period, said first period being loaded into the timer and defining a sleeping phase during which no new management messages are expected;
receiving a request from a user to pass from the active state to the standby state;
determining by the timer if the first period has expired and the sleeping phase has completed;
  if the first period has expired and the sleeping phase has completed;
    changing a power setting into active/standby state to initiate a waiting phase; and
    during the waiting phase, waiting until a second management message, containing said first period, is received, and upon reception of the second management message, changing the power setting into the standby state, and re-initializing the timer by the first period;
  if the first period has not expired and the sleeping phase has not completed;
    changing the power setting into the standby state,
wherein the received management messages further comprise information for renewing rights related to conditional access to broadcast signals.

* * * * *